April 19, 1938. G. GORT 2,114,681
PARKWAY CABLE OUTLET
Filed Dec. 1, 1936
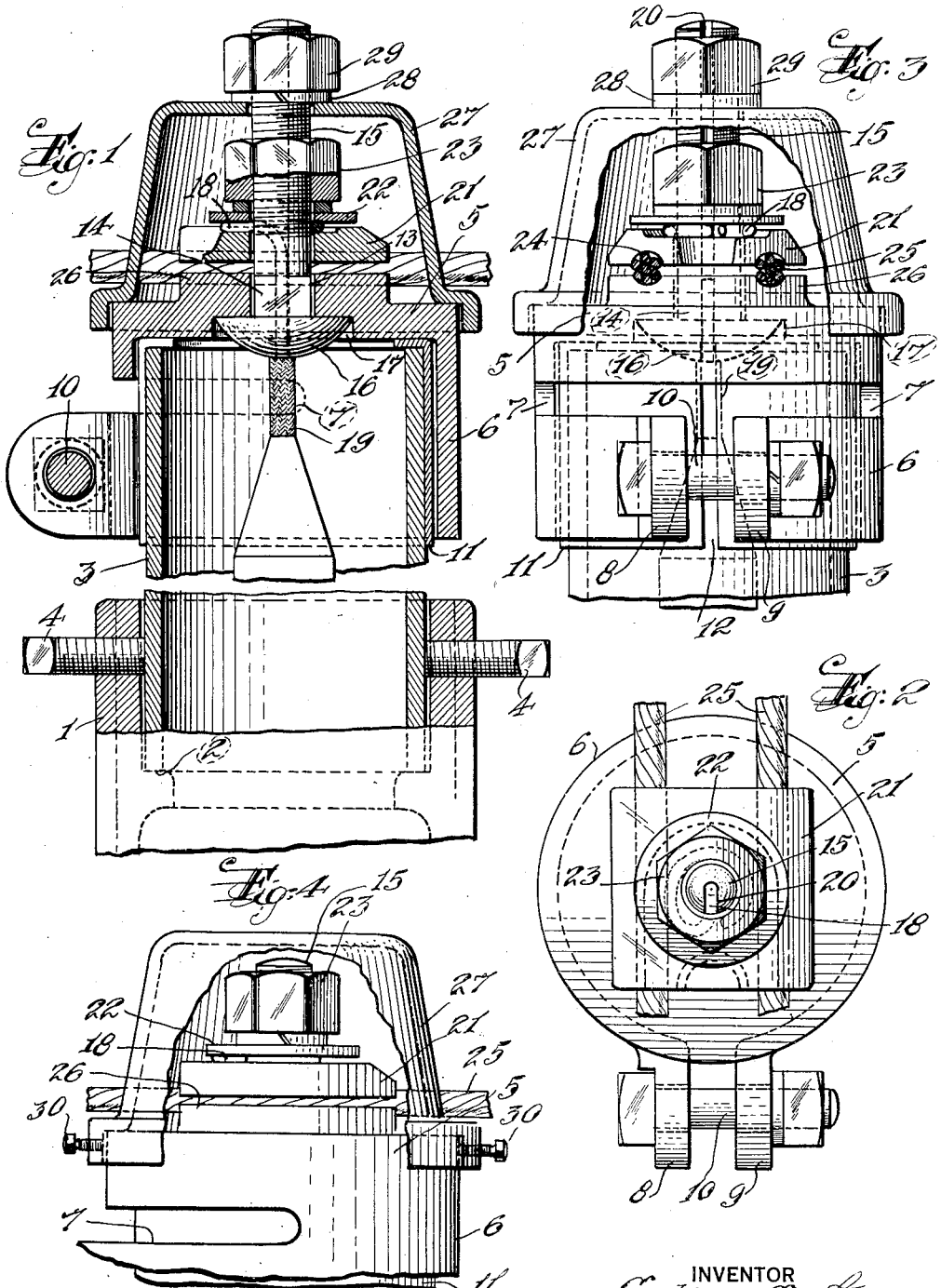
INVENTOR
Godfrey Gort
BY A. D. T. Libby
ATTORNEY Patented Apr. 19, 1938

2,114,681

UNITED STATES PATENT OFFICE 2,114,681

PARKWAY CABLE OUTLET

Godfrey Gort, Chicago, Ill., assignor to Western Railroad Supply Company, Chicago, Ill.

Application December 1, 1936, Serial No. 113,574

4 Claims. (Cl. 247—1)

This invention relates to a simplified design of a parkway cable outlet, such devices being used in connection with railway signal track circuits, although not necessarily limited to such use. In devices of this kind, the parkway cable is brought up through the standard, which is generally referred to in the trade as a "bootleg", to a suitable fitting at the top of the standard, at which point connection is made to the parkway cable wire by the bond wires running to the track.

The principal object of my invention is to reduce the cost of such a device by reducing and simplifying the number of parts used.

Other objects will be clear to one after reading the following specification, taken in connection with the annexed drawing, wherein:

Figure 1 is a view, partly in section and partly in elevation, of my improved form of parkway cable outlet or bootleg.

Figure 2 is a plan view of the top of the fitting, with the cover removed.

Figure 3 is an elevational view of the top part of the bootleg, looking from left to right of Figure 1.

Figure 4 is a view similar to Figure 1, but showing a modification thereof.

In the drawing, wherein like numbers refer to corresponding parts in the various views, 1 is a fragmentary portion of a base having a seat 2 for an outlet pipe or standard 3 which is clamped to the base 1 in any satisfactory manner as by set screws 4. Since the base portion may be of any of the well-known types to suit the installation conditions, it has not been shown in detail.

Mounted on the top of the pipe or standard 3, is a fitting having a plate portion 5 and a downwardly extending skirt or flange 6 which has a cross-slot 7 therein, and separated by lugs 8 and 9 having holes therein to receive a clamping bolt 10 to clamp the fitting in suitable arcuately adjustable position on the standard 3. The flange 6 is insulated from the pipe by an insulator 11 which may be in one or more pieces, but, as indicated, is shown in one piece which is split at 12, so that the flange 6 may be securely clamped around the upper end of the standard.

The plate 5 has a centrally located polygonally shaped hole 13, preferably square, to receive a square portion 14 of a carriage bolt 15 having a head 16 which, while shown seated in a recess 17 in the plate 5, may seat against an inner flat surface of the plate portion 5. The bolt 15 has a hole or passageway therethrough to receive the wire 18 of the parkway cable 19.

As shown in Figure 1, the bolt 15 has an opening 20 in the form of a slot which extends a sufficient distance from the nut end of the bolt toward the head to allow the wire 18 to be brought out at the proper place, preferably above the clamping member 21, and to fit into a recess therein, being held in place by a washer 22 and lock nut 23. The clamp 21 is preferably grooved on opposite sides of the bolt 15 to receive bond wires 24 and 25. While the plate 5 is shown with a raised boss 26, having cooperative grooves to receive the wires 24 and 25, this is not necessary, as a washer or the clamping member 21 in reverse position may be used.

Covering the circuit connections on the bolt 15, is a cap or cover 27. As shown in Figure 1, the cap 27 is held in position on the plate 5 by a lock washer 28 and nut 29 carried by the bolt 15. In Figure 4, however, the bolt 15 does not go through the cap 27, which may be held to the plate 5 in any other satisfactory manner as by a plurality of set screws 30. By using this latter construction, the outlet bolt is completely concealed within the cover, whereas, if the construction of Figures 1 and 3 is used, the slot 20, which extends all the way to the passageway for the wire 18, will need to be plugged with sealing wax or the like so that moisture and dirt cannot work down into the outlet connection and into the standard.

Certain changes may, of course, be made in the details, without departing from the spirit of my invention. For example, instead of using a longitudinal slot 20, a cross bore may be used which will intercept the passageway of the wire 18 so that it may be brought out from the interior of the bolt 15. Likewise, in the construction of Figure 4, the bolt 15 per se can be readily insulated from the plate 5 so that the insulator 11 would not be required. Therefore, in the claims, where I refer to the bolt as being insulated from the bootleg standard, this language is intended to cover either form of construction.

What I claim is:

1. A parkway cable outlet including a hollow standard through which the cable is brought, a fitting mounted on the end of the standard and extending thereover, a bolt non-rotatably mounted in and extending upwardly from the fitting, said bolt being insulated from the standard and having a passageway therethrough to receive the cable wire, the outer end of the bolt having an opening through its wall into the hole to bring out the cable wire, and clamping means for clamping the bolt to the plate portion and the cable wire and outgoing bond wires to said bolt; and a cover for at least the circuit connections on the bolt.

2. A parkway cable outlet as set forth in claim 1, further characterized in that the opening through the wall of the bolt comprises a longitudinal slot from which the cable wire may be readily bent forwardly out of the passageway in the bolt.

3. Means for bringing out a parkway cable from a bootleg including a cap member for fitting over the end of the bootleg standard, a bolt non-rotatably mounted in the cap member, said bolt being insulated from the bootleg standard and having a passageway therethrough for taking the cable wire out of the standard, means for clamping the cable wire and outgoing bond wire to said bolt, and a cover for at least the bolt connections.

4. Means for bringing out a parkway cable from a bootleg as set forth in claim 3, in which the constructional arrangement is such that the insulation on the cable, when properly installed, acts to prevent the bolt from dropping into the bootleg standard when the clamping means are removed from the bolt.

GODFREY GORT.